US012706549B2

(12) United States Patent
Akiyama et al.

(10) Patent No.: US 12,706,549 B2
(45) Date of Patent: Aug. 11, 2026

(54) POWER CONVERSION DEVICE, RECORDING MEDIUM, AND CONTROL METHOD FOR OUTPUT VOLTAGE CORRECTION

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Yukina Akiyama, Kawasaki Kanagawa (JP); Shunsuke Kawachi, Tokyo (JP); Yuki Kudo, Tokyo (JP); Yoko Sakauchi, Tokyo (JP); Koji Toba, Tokyo (JP); Kenji Mitsumoto, Tokyo (JP); Daisuke Takeda, Kawasaki Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 243 days.

(21) Appl. No.: 18/718,676

(22) PCT Filed: Dec. 15, 2021

(86) PCT No.: PCT/JP2021/046383

§ 371 (c)(1),
(2) Date: Jun. 11, 2024

(87) PCT Pub. No.: WO2023/112231

PCT Pub. Date: Jun. 22, 2023

(65) Prior Publication Data

US 2025/0047214 A1 Feb. 6, 2025

(51) Int. Cl.
*H02M 7/48* (2007.01)
*H02M 7/537* (2006.01)

(52) U.S. Cl.
CPC .................................. *H02M 7/537* (2013.01)

(58) Field of Classification Search
CPC ...... H02M 7/537; H02M 7/48; H02M 7/1557; H02M 7/1555; H02M 7/1623;
(Continued)

(56) References Cited

U.S. PATENT DOCUMENTS

2017/0047861 A1 2/2017 Sakimoto et al.
2017/0229868 A1 * 8/2017 Laval .................... H02J 3/0073
2020/0116127 A1 4/2020 Brombach et al.

FOREIGN PATENT DOCUMENTS

CN 109494800 A * 3/2019 ................ H02J 3/38
CN 109962494 A * 7/2019 ............. H02J 3/381

(Continued)

*Primary Examiner* — Monica Lewis
*Assistant Examiner* — Jared Raymond Hausman
(74) *Attorney, Agent, or Firm* — Finnegan, Henderson, Farabow, Garrett & Dunner, LLP

(57) ABSTRACT

A power conversion device is disclosed in which a first command to change amplitude and phase of AC-power by grid forming control (GFM) is generated. A second command to change amplitude and phase of the AC-power by grid following control (GFL) is generated. A modulation circuit changes amplitude and phase of the AC-power in response to the first or second command. The first command is corrected before input to the modulation circuit is switched from the second command to the first command such that a difference between target amplitude of the first command and amplitude of a given grid voltage becomes a threshold or smaller, a difference between target frequency of the first command and frequency of the grid voltage becomes a threshold or smaller, and a difference between target phase of the first command and phase of the grid voltage becomes a threshold or smaller.

9 Claims, 5 Drawing Sheets

(58) Field of Classification Search
CPC .. H02M 7/1626; H02M 7/527; H02M 7/5395; H03K 17/165
See application file for complete search history.

(56) References Cited

FOREIGN PATENT DOCUMENTS

| | | | | | |
|---|---|---|---|---|---|
| CN | 110138010 | A | * | 8/2019 | .............. H02M 7/48 |
| CN | 112600240 | A | * | 4/2021 | ................ H02J 3/42 |
| JP | H6-86560 | A | | 3/1994 | |
| JP | 2015-211617 | A | | 11/2015 | |
| JP | 2020-524970 | A | | 8/2020 | |
| WO | WO 2015/070493 | A1 | | 5/2015 | |

* cited by examiner

102
GFM CONTROLLER
112
PHASE CONTROLLER
P-f DROOP CONTROL OR VSG CONTROL
111
VOLTAGE CONTROLLER
Q-V DROOP CONTROL
AVR
113
SYNCHRO-NIZATION ADJUSTING UNIT
dq
abc
105
120
PWM
GFL CONTROLLER
103
CONDITION SATISFACTION NOTIFICATION SIGNAL
SWITCHING SIGNAL

POWER CONVERSION DEVICE, RECORDING MEDIUM, AND CONTROL METHOD FOR OUTPUT VOLTAGE CORRECTION

CROSS-REFERENCE TO RELATED APPLICATIONS

This application is national stage application of International Application No. PCT/JP2021/046383, filed on Dec. 15, 2021, which designates the United States, incorporated herein by reference.

FIELD

Embodiments described herein relate generally to a power conversion device, a recording medium, and a control method.

BACKGROUND

In recent years, utilization of an inverter power supply is developed. The inverter power supply converts DC power output from power supplies such as generators utilizing renewable energy and storage batteries into AC power and outputs the AC power. As a control system for inverter power supplies, a grid forming (GFM) type and a grid following (GFL) type have been known. Control of the GFM type (hereinafter referred to as GFM control) is control for maintaining an amplitude and a phase of an output voltage of an inverter power supply at given set values. Control of the GFL type (hereinafter referred to as GFL control) is control for causing the amplitude and the phase of the output voltage of the inverter power supply to follow an amplitude and a phase of a voltage of a given power grid. The GFM control and the GFL control described above may be switched in accordance with use situations and the like of the inverter power supply.

DETAILED DESCRIPTION

A power conversion device includes a conversion circuit, a grid forming control circuit, a grid following control circuit, a modulation circuit, a switching circuit, and a synchronization adjusting circuit. The conversion circuit is configured to convert DC power output from a power supply into AC power and output the AC power. The grid forming control circuit is configured to generate a first modulation command to change an amplitude and a phase of an output voltage from the conversion circuit by grid forming control for maintaining the amplitude and the phase of the output voltage at given set values. The grid following control circuit is configured to generate a second modulation command to change the amplitude and the phase of the output voltage by grid following control for causing the amplitude and the phase of the output voltage to follow an amplitude and a phase of a grid voltage as a voltage of a given power grid. The modulation circuit is configured to change the amplitude and the phase of the output voltage on the basis of the first modulation command or the second modulation command. The switching circuit is configured to switch input to the modulation circuit such that either the first modulation command or the second modulation command is input to the modulation circuit. The synchronization adjusting circuit is configured to correct the first modulation command before the input to the modulation circuit is switched from the second modulation command to the first modulation command. The first modulation command is corrected such that a difference between a target amplitude of the first modulation command and the amplitude of the grid voltage is equal to or smaller than a threshold, a difference between a target frequency of the first modulation command and a frequency of the grid voltage is equal to or smaller than a threshold, and a difference between a target phase of the first modulation command and the phase of the grid voltage is equal to or smaller than a threshold.

The following describes an embodiment with reference to the accompanying drawings.

Figure 1:
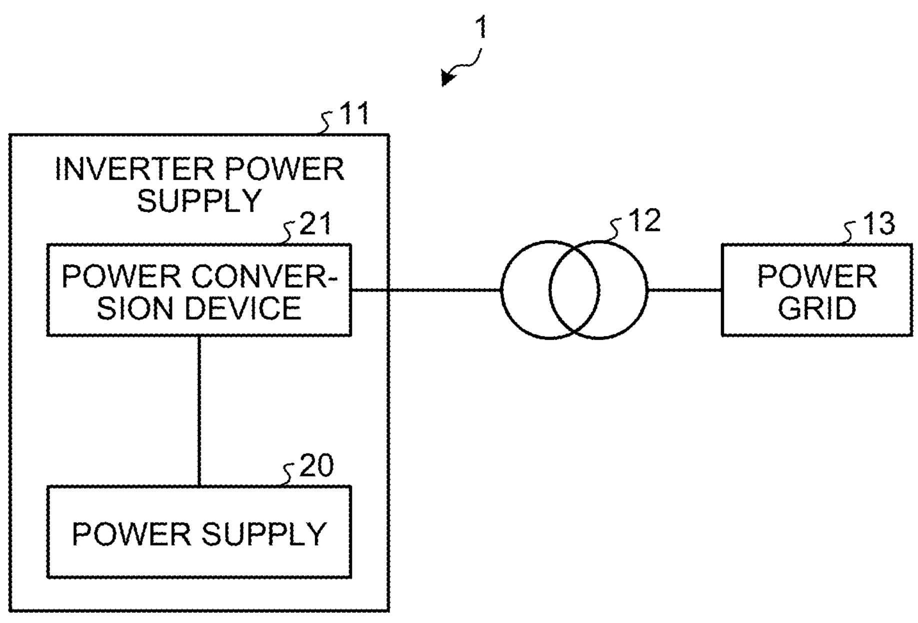
FIG. 1 is a block diagram of an example of a configuration of a power system of an embodiment.

FIG. 1 is a block diagram of an example of a configuration of a power system 1 of the embodiment. The power system 1 includes an inverter power supply 11, a transformer 12, and a power grid 13. The power system 1 can be, for example, a so-called microgrid system that constitutes the self-contained power grid 13 utilizing a distributed power supply including power supplies such as the inverter power supply 11.

The inverter power supply 11 includes a power supply 20 and a power conversion device 21. The power supply 20 is a unit for outputting DC power and can be, for example, a generator utilizing renewable energy (for example, sunlight, wind power, or the like), a storage battery, or the like. The power conversion device 21 is a device converting the DC power output from the power supply 20 into AC power and outputting the AC power. Note that a plurality of power supplies 20 may be connected to one power conversion device 21.

The power conversion device 21 of the present embodiment includes a function of executing, in a switchable manner as appropriate, grid forming control (GFM control) for maintaining an amplitude and a phase of an output voltage at given set values, and grid following control (GFL control) for causing the amplitude and the phase of the output voltage to follow an amplitude and a phase of a voltage of the power grid 13.

The AC power output from the inverter power supply 11 (the power conversion device 21) is boosted by the transformer 12, and is then output to the power grid 13. Note that the transformer 12 may be unnecessary depending on the characteristics of the inverter power supply 11 and the power grid 13.

Figure 2:
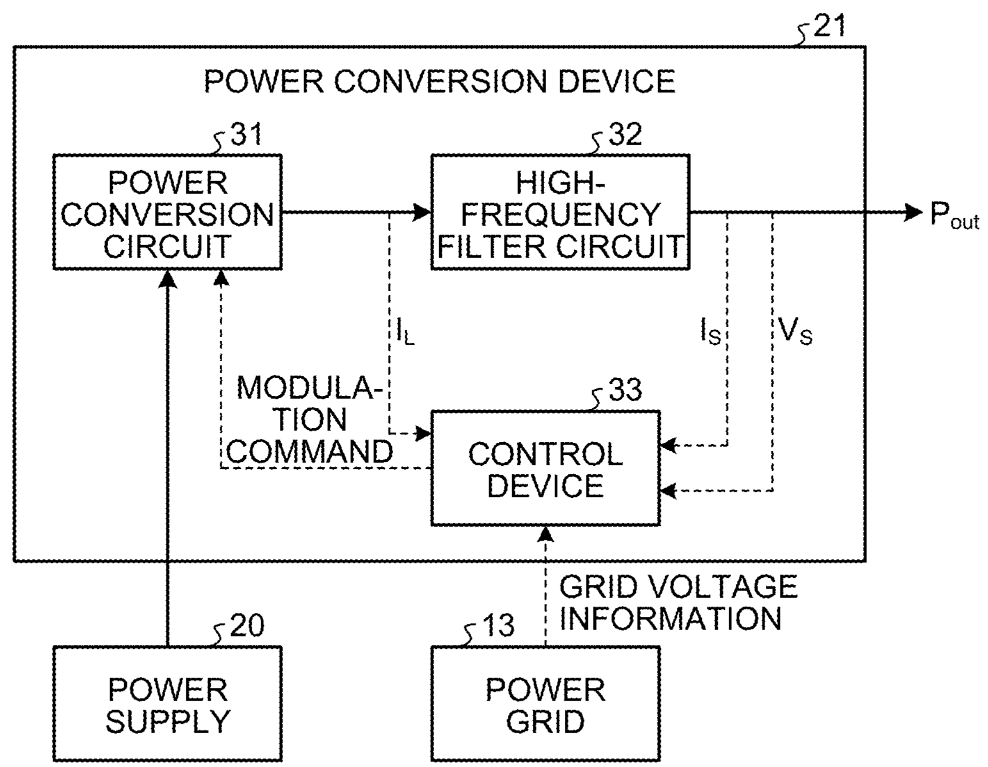
FIG. 2 is a block diagram of an example of a hardware configuration of a power conversion device of the embodiment.

FIG. 2 is a block diagram of an example of a hardware configuration of the power conversion device 21 of the embodiment. The exemplified power conversion device 21 includes a power conversion circuit 31, a high-frequency filter circuit 32, and a control device 33 (an example of an information processing apparatus).

The power conversion circuit 31 is a circuit that converts the DC power output from the power supply 20 into the AC power. The power conversion circuit 31 can be constituted by utilizing, for example, a converter circuit, a pulse width modulation (PWM) circuit, or the like. The high-frequency filter circuit 32 is a circuit (for example, a reactor) that performs high-frequency filter (low-pass) processing on the output of the power conversion circuit 31. The control device 33 is an integrated circuit including a central processing unit (CPU), a memory, and the like. The control device 33 executes computing processing and control processing in accordance with a computer program stored in the memory. The control device 33 may be configured utilizing an application specific integrated circuit (ASIC), a field programmable gate array (FPGA), or the like.

The power conversion circuit 31 changes the amplitude and the phase of the output voltage on the basis of a modulation command output from the control device 33. The control device 33 performs the GFM control or the GFL control on the basis of a feedback signal of the output from the power conversion circuit 31, grid voltage information on the voltage of the power grid 13, and the like, to generate a modulation command to change the amplitude and the phase of output power $P_{out}$ (an output voltage $V_S$) from the power conversion device 21. In the configuration exemplified herein, the control device 33 calculates active power and reactive power on the basis of a reactor current $I_L$ flowing through the high-frequency filter circuit 32, an output current Is from the high-frequency filter circuit 32, the output voltage $V_S$ from the high-frequency filter circuit 32, etc.

The control device 33 of the present embodiment has a function of switching between the GFM control and the GFL control in accordance with a given condition, a function of correcting the modulation command in order to improve stability at the time of switching from the GFL control to the GFM control (for example, a reduction in sudden fluctuations in the output voltage or the like), etc.

Figure 3:
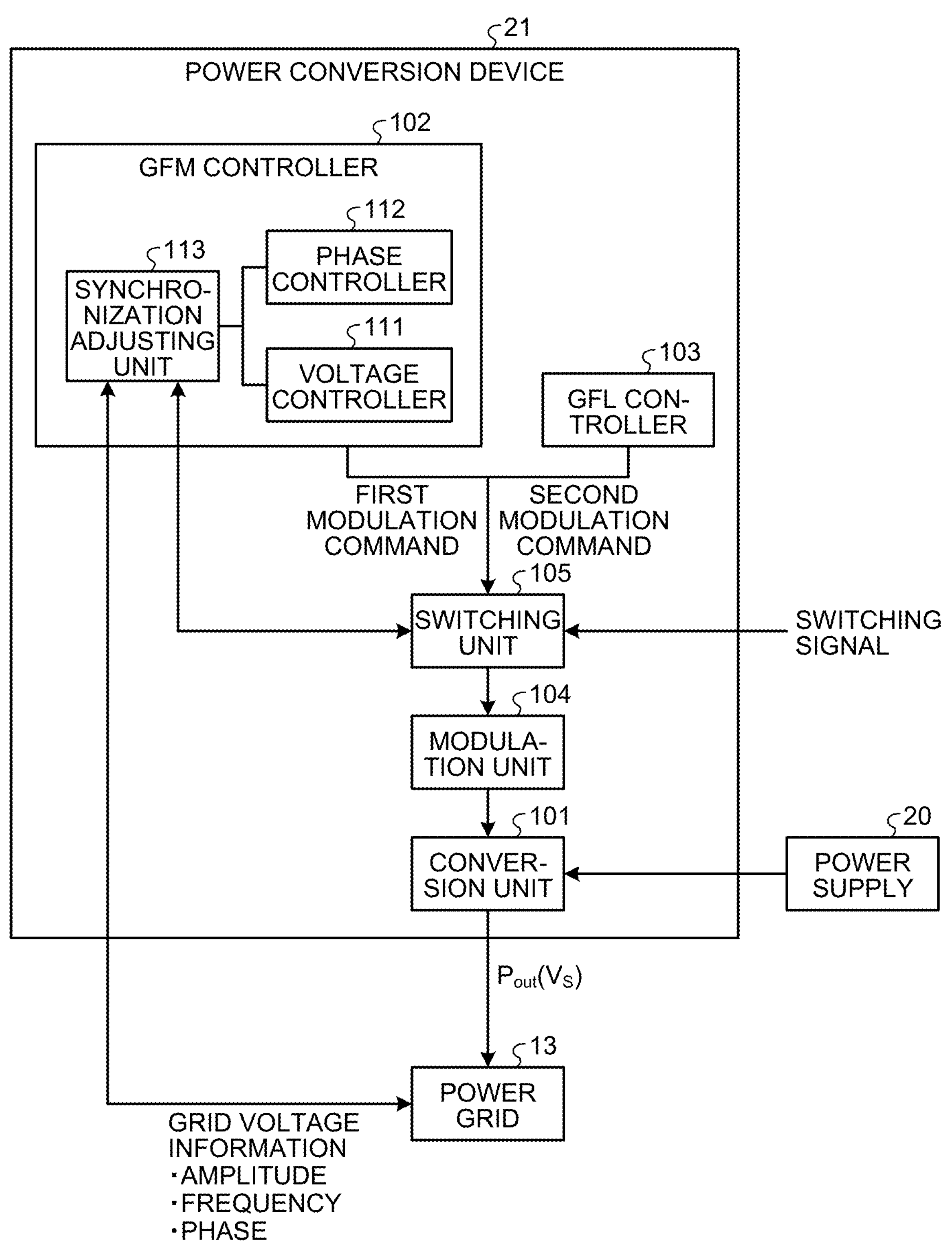
FIG. 3 is a block diagram of an example of a functional configuration of the power conversion device of the embodiment.

FIG. 3 is a block diagram of an example of a functional configuration of the power conversion device 21 of the embodiment. The power conversion device 21 of the present embodiment includes a conversion unit 101, a GFM controller 102 (a grid forming control unit), a GFL controller 103 (a grid following control unit), a modulation unit 104, and a switching unit 105. These functional elements 101 to 105 can be configured by, for example, cooperation of hardware elements exemplified in FIG. 2 and software elements such as a computer program controlling the control device 33.

The conversion unit 101 outputs the output power (active output power) $P_{out}$ obtained by converting the DC power output from the power supply 20 into the AC power. In this process, the amplitude and the phase of the output voltage $V_S$ from the conversion unit 101 are adjusted by the modulation unit 104.

The GFM controller 102 executes the GFM control for maintaining the amplitude and the phase of the output voltage $V_S$ at given set values to generate a first modulation command to change the amplitude and the phase of the output voltage $V_S$ by the GFM control. The GFL controller 103 executes the GFL control for causing the amplitude and the phase of the output voltage $V_S$ to follow an amplitude and a phase of a voltage (a grid voltage) of a predetermined power grid (for example, the power grid 13) to generate a second modulation command to change the amplitude and the phase of the output voltage $V_S$ by the GFL control.

The switching unit 105 switches input to the modulation unit 104 such that either the first modulation command or the second modulation command is input to the modulation unit 104 in accordance with a switching signal output from a given control mechanism. The modulation unit 104 changes the amplitude and the phase of the output voltage $V_S$ on the basis of the first modulation command or the second modulation command.

The GFM controller 102 of the present embodiment includes a voltage controller 111, a phase controller 112, and a synchronization adjusting unit 113.

The voltage controller 111 generates an amplitude command indicating a target value of the amplitude of the output voltage $V_S$ computed by the GFM control. The phase controller 112 generates a phase command indicating a target value of the phase of the output voltage $V_S$ computed by the GFM control. The first modulation command is generated on the basis of the amplitude command generated by the voltage controller 111 and the phase command generated by the phase controller 112.

The synchronization adjusting unit 113 corrects the first modulation command such that fluctuations in the output voltage $V_S$ are reduced when the GFL control is switched to the GFM control. Before the input to the modulation unit 104 is switched from the second modulation command to the first modulation command, the synchronization adjusting unit 113 of the present embodiment corrects the first modulation command such that a difference between a target amplitude of the first modulation command and the amplitude of the grid voltage is equal to or smaller than a threshold, a difference between a target frequency of the first modulation command and a frequency of the grid voltage is equal to or smaller than a threshold, and a difference between a target phase of the first modulation command and the phase of the grid voltage is equal to or smaller than a threshold.

Figure 4:
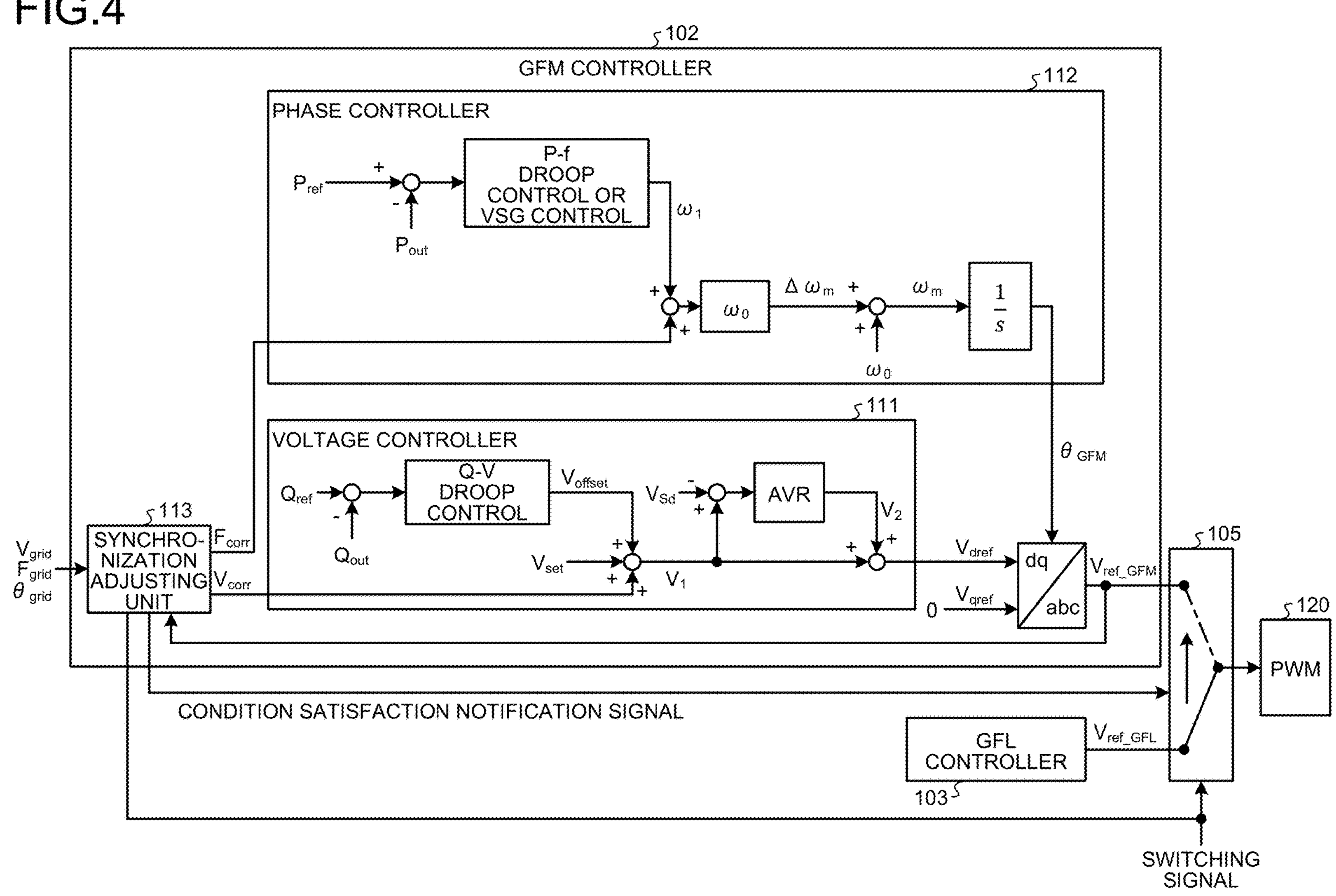
FIG. 4 is a control block diagram of an example of processing in a GFM controller of the embodiment.

FIG. 4 is a control block diagram of an example of processing in the GFM controller 102 of the embodiment. In the voltage controller 111, an amplitude command offset value $V_{offset}$ is computed by Q-V droop control on a value obtained by subtracting a reactive power output value $Q_{out}$ from a reactive power command value $Q_{ref}$. A first amplitude set value $V_1$ is computed by adding a reference amplitude set value Vset, the amplitude command offset value $V_{offse}$t, and an amplitude command correction value $V_{corr}$ (an example of an amplitude correction signal) described below. A second amplitude set value $V_2$ is computed by automatic voltage regulator (AVR) on a value that is obtained by subtracting a d-axis grid amplitude $V_{sd}$ from the first amplitude set value $V_1$. An inverter output d-axis amplitude command value $V_{dref}$ (an example of the target amplitude) as a d-axis amplitude command is computed by adding the first amplitude set value $V_1$ and the second amplitude set value $V_2$. An inverter output q-axis amplitude command value $V_{qref}$ as a q-axis amplitude command is 0 during a normal state (for example, when the GFM control is executed on a given stable state).

In the phase controller 112, a frequency co is computed by P-f droop control or virtual synchronous generator (VSG) control on a value obtained by subtracting the active power output value $P_{out}$ from an active power command value $P_{ref}$. A deviation $\Delta\omega_m$ between a value obtained by adding the frequency co and a frequency command correction value $F_{corr}$ (an example of a frequency correction signal) described below and a reference frequency $\omega_0$ of an inverter output voltage frequency is computed. An inverter output voltage phase $\theta_{GFM}$ (an example of the target phase) as a phase command is computed by integrating an inverter output voltage frequency om (an example of the target frequency) obtained by adding the deviation $\Delta\omega_m$ and the reference frequency $\omega_0$ with a transfer function 1/s of an integral element. In this process, s is a Laplace operator.

An inverter output voltage command value $V_{ref\_GFM}$ as the first modulation command is generated on the basis of the inverter output d-axis amplitude command value $V_{dref}$, the inverter output q-axis amplitude command value $V_{qref}$, and the inverter output voltage phase $\theta_{GFM}$. The GFL controller 103 generates an inverter output voltage command value $V_{ref\_GFL}$ as the second modulation command by predetermined GFL control utilizing phase locked loop (PLL) or the like. The switching unit 105 switches input to a PWM 120 modulating the output voltage $V_S$ on the basis of the switching signal such that either the inverter output voltage command value $V_{ref\_GFM}$ or the inverter output voltage command value $V_{ref\_GFL}$ is input.

The synchronization adjusting unit 113 generates an amplitude command correction value $V_{corr}$ and a frequency command correction value $F_{corr}$ on the basis of a grid amplitude $V_{grid}$ indicating the amplitude of the grid voltage, a grid frequency $F_{grid}$ indicating the frequency of the grid voltage, a grid phase $\theta_{grid}$ indicating the phase of the grid voltage, and the inverter output voltage command value $V_{ref\_GFM}$ as a feedback signal. The amplitude command correction value $V_{corr}$ is generated such that an amplitude difference being a difference between the grid amplitude $V_{grid}$ and the inverter output d-axis amplitude command value $V_{dref}$ becomes small when the input to the PWM 120 is switched from the inverter output voltage command value $V_{ref\_GFL}$ to the inverter output voltage command value $V_{ref\_GFM}$. The frequency command correction value $F_{corr}$ is generated such that a frequency difference being a difference between the grid frequency $F_{grid}$ and the inverter output voltage frequency om becomes small when the input to the PWM 120 is switched from the inverter output voltage command value $V_{ref\_GFL}$ to the inverter output voltage command value $V_{ref\_GFM}$. In other words, the amplitude command correction value $V_{corr}$ is generated so as to make a correction value with respect to the inverter output d-axis amplitude command value $V_{dref}$ larger as the amplitude difference is larger, and the frequency command correction value $F_{corr}$ is generated so as to make a correction value with respect to the inverter output voltage frequency om larger as the frequency difference is larger.

The synchronization adjusting unit 113 outputs a condition satisfaction notification signal to the switching unit 105 when the frequency difference as the difference between the grid amplitude $V_{grid}$ and the inverter output d-axis amplitude command value $V_{dref}$ is equal to or smaller than a threshold, the frequency difference as the difference between the grid frequency $F_{grid}$ and the inverter output voltage frequency om is equal to or smaller than a threshold, and a phase difference as a difference between the grid phase $\theta_{grid}$ and the inverter output voltage phase $\theta_{GFM}$ is equal to or smaller than a threshold. After receiving the condition satisfaction notification signal, the switching unit 105 switches the input to the PWM 120 from the inverter output voltage command value $V_{ref\_GFL}$ to the inverter output voltage command value $V_{ref\_GFM}$.

Figure 5:
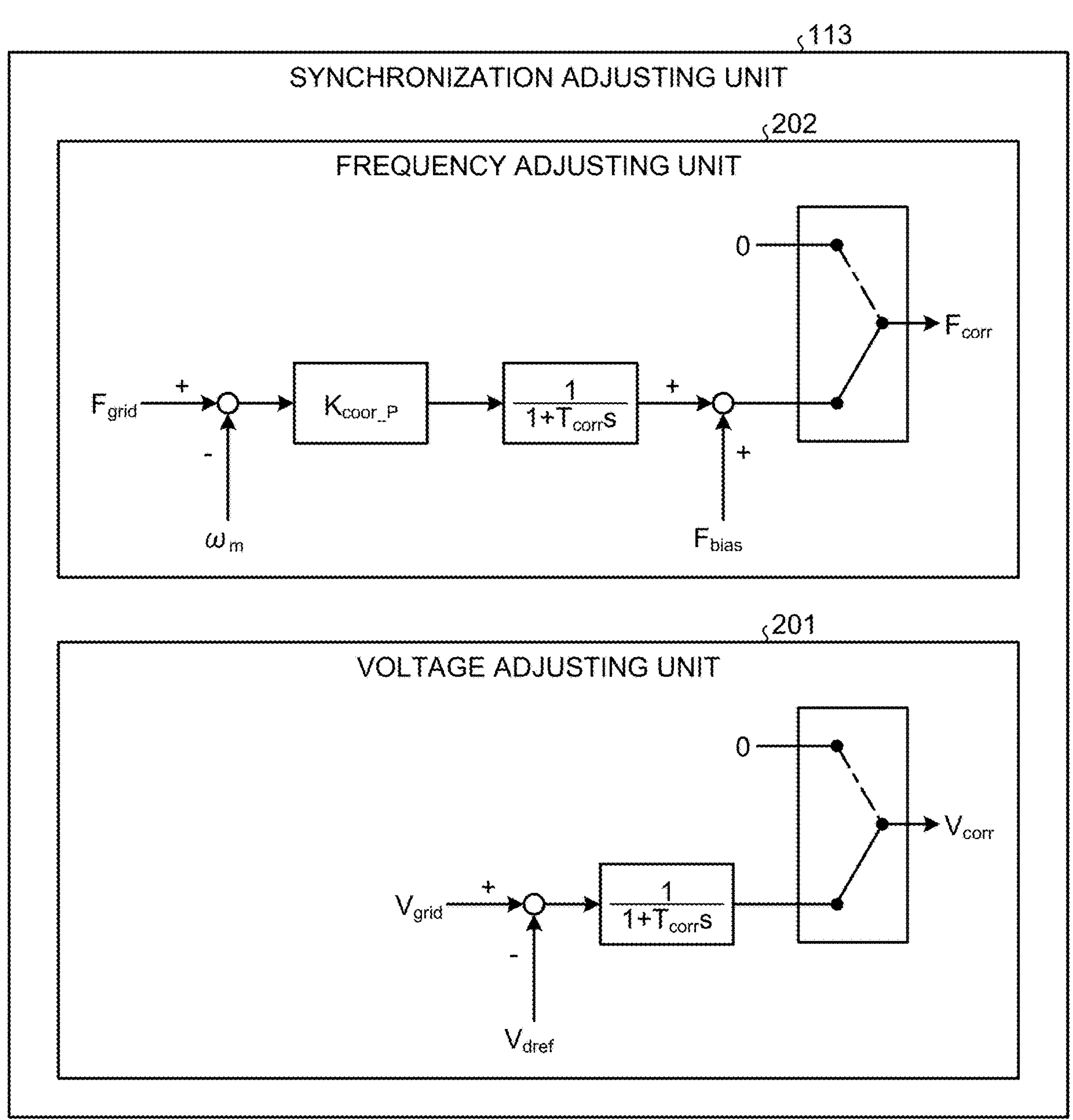
FIG. 5 is a control block diagram of an example of processing in a synchronization adjusting unit of the embodiment.

FIG. 5 is a control block diagram of an example of processing in the synchronization adjusting unit 113 of the embodiment. The synchronization adjusting unit 113 of the present embodiment includes a voltage adjusting unit 201 and a frequency adjusting unit 202.

In the voltage adjusting unit 201, a transfer function of a first-order delay element with a given time constant $T_{corr}$ is applied to a value obtained by subtracting the inverter output d-axis amplitude command value $V_{dref}$ from the grid amplitude $V_{grid}$. Here, s in FIG. 5 is a Laplace operator. The value after the processing by the transfer function of the first-order delay element is the amplitude command correction value $V_{corr}$. The amplitude command correction value $V_c$Of is reset to zero (0) after completion of switching from the GFL control to the GFM control.

In the frequency adjusting unit 202, proportional gain processing with a given constant $K_{corr\_P}$ is applied to a value obtained by subtracting the inverter output voltage frequency om from the grid frequency $F_{grid}$, and a transfer function of a first-order delay element using the given time constant $T_{corr}$ is applied to the value after the proportional gain processing. The frequency command correction value $F_{corr}$ is the sum of a value obtained after the processing by the transfer function of the first-order delay element and a given bias frequency $F_{bias}$. The frequency command correction value $F_{corr}$ is reset to zero after completion of switching from the GFL control to the GFM control. By the processing adding the bias frequency $F_{bias}$, the frequency command correction value $F_{corr}$ is avoided from becoming zero before the switching from the GFL control to the GFM control. This can avoid a problem that the grid frequency $F_{grid}$ and the frequency of the output voltage $V_S$ agree to each other, and the difference in phase (the phase difference) between the two frequencies does not change, thus failing to satisfy the above-described condition “the phase difference becomes equal to or smaller than a threshold”.

Figure 6:
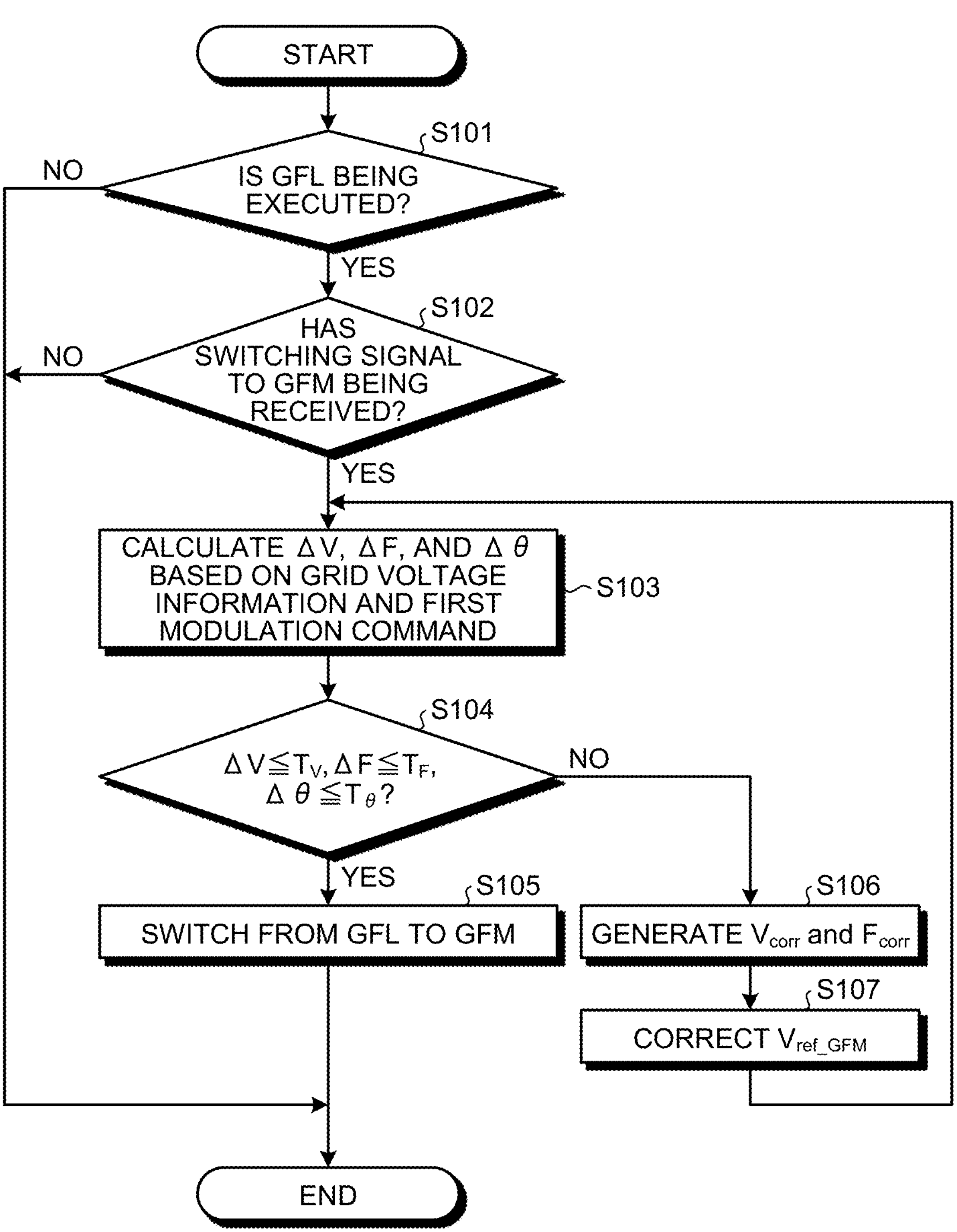
FIG. 6 is a flowchart of an example of processing at the time of switching from GFL control to GFM control by the power conversion device of the embodiment.

FIG. 6 is a flowchart of an example of processing at the time of switching from the GFL control to the GFM control by the power conversion device 21 of the embodiment. The synchronization adjusting unit 113 determines whether the GFL control is being executed (whether the second modulation command has been input to the modulation unit 104) (S101), and, when the GFL control is not being executed (No at S101), ends the present routine. When the GFL control is being executed (Yes at S101), the synchronization adjusting unit 113 determines whether the switching signal for switching to the GFM control has been received (S102), and, when the switching signal to the GFM control has not been received (No at S103), ends the present routine.

When the switching signal to the GFM control has been received (Yes at S102), the synchronization adjusting unit 113 calculates an amplitude difference ΔV, a frequency difference ΔF, and a phase difference Δθ, on the basis of the grid voltage information (the grid amplitude $V_{grid}$, the grid frequency $F_{grid}$, and the grid phase $\theta_{grid}$) acquired from the power grid 13 and the first modulation command (the inverter output voltage command value $V_{ref\_GFM}$) (S103). Subsequently, the synchronization adjusting unit 113 determines whether the amplitude difference ΔV is equal to or smaller than a threshold $T_V$, the frequency difference ΔF is equal to or smaller than a threshold $T_F$, and the phase difference Δθ is equal to or smaller than a threshold $T_\theta$ (S104).

When the amplitude difference ΔV is equal to or smaller than the threshold $T_V$, the frequency difference ΔF is equal to or smaller than the threshold $T_F$, and the phase difference Δθ is equal to or smaller than the threshold $T_\theta$ (Yes at S104), switching from the GFL control to the GFM control is executed (S105). Specifically, the synchronization adjusting unit 113 outputs the condition satisfaction notification signal to the switching unit 105. Upon reception of the condition satisfaction notification signal, the switching unit 105 switches the input to the PWM 120 from the inverter output voltage command value $V_{ref\_GFL}$ to the inverter output voltage command value $V_{ref\_GFM}$.

On the other hand, when the condition that the amplitude difference ΔV is equal to or smaller than the threshold $T_V$, the frequency difference ΔF is equal to or smaller than the threshold $T_F$, and the phase difference Δθ is equal to or smaller than the threshold $T_\theta$ is not satisfied (No at S104), the synchronization adjusting unit 113 generates the amplitude command correction value $V_{corr}$ and the frequency command correction value $F_{corr}$ (S106), and corrects the inverter output voltage command value $V_{ref\_GFM}$ by using the amplitude command correction value $V_{corr}$ and the frequency command correction value $F_{corr}$ (S107). Subsequently, Step S103 is executed again on the basis of the corrected inverter output voltage command value $V_{ref\_GFM}$.

According to the above-described embodiment, the first modulation command (the inverter output voltage command value $V_{ref\_GFM}$) is corrected such that the amplitude difference ΔV, the frequency difference ΔF, and the phase difference Δθ each become equal to or smaller than the threshold before the switching from the GFL control to the GFM control. This can reduce sudden fluctuations in the output voltage at the time of the switching from the GFL control to the GFM control and improve stability at the time of switching of the control system.

A computer program for implementing the function of the power conversion device 21 of the embodiment described above is mainly provided embedded in advance in a storage device included in the power conversion device 21, but is not limited to this. The computer program may be recorded and provided in a computer-readable recording medium such as a compact disc read only memory (CD-ROM), a flexible disk (FD), a compact disc recordable (CD-R), and a digital versatile disc (DVD), as an installable or executable file. The recording medium is not limited to a medium independent of a computer or incorporated system, but includes a recording medium in which a computer program transmitted via a local area network (LAN), the Internet, or the like is downloaded and stored or temporarily stored.

The computer program may be stored in a computer connected to a network such as the Internet and be provided by being downloaded via the network or provided or distributed via a network such as the Internet.

The above has described some embodiments of the present invention. These embodiments have been presented by way of example and do not intend to limit the scope of the invention. These novel embodiments can be performed in other various ways, and various omissions, replacements, and modifications can be made without departing from the gist of the invention. These embodiments and modifications thereof are included in the scope and the gist of the invention and are also included in the inventions described in the claims and the scope of equivalence thereof.

REFERENCE SIGNS LIST

1: power system, 11: inverter power supply, 12: transformer, 13: power grid, 20: power supply, 21: power conversion device, 31: power conversion circuit, 32: high-frequency filter circuit, 33: control device, 101: conversion unit, 102: GFM controller, 103: GFL controller, 104: modulation unit, 105: switching unit, 111: voltage controller, 112: phase controller, 113: synchronization adjusting unit, 120: PWM, 201: voltage adjusting unit, 202: frequency adjusting unit

The invention claimed is:

1. A power conversion device comprising:

a conversion unit circuit configured to convert DC power output from a power supply into AC power and output the AC power;

a grid forming control unit circuit configured to generate a first modulation command to change an amplitude and a phase of an output voltage from the conversion unit circuit by grid forming control for maintaining the amplitude and the phase of the output voltage at given set values;

a grid following control unit circuit configured to generate a second modulation command to change the amplitude and the phase of the output voltage by grid following control for causing the amplitude and the phase of the output voltage to follow an amplitude and a phase of a grid voltage as a voltage of a given power grid;

a modulation unit circuit configured to change the amplitude and the phase of the output voltage on the basis of the first modulation command or the second modulation command;

a switching unit circuit configured to switch input to the modulation unit circuit such that either the first modulation command or the second modulation command is input to the modulation unit circuit; and a synchronization adjusting unit circuit configured to correct the first modulation command before the input to the modulation unit circuit is switched from the second modulation command to the first modulation command, the first modulation command being corrected such that a difference between a target amplitude of the first modulation command and the amplitude of the grid voltage is equal to or smaller than a threshold, a difference between a target frequency of the first modulation command and a frequency of the grid voltage is equal to or smaller than a threshold, and a difference between a target phase of the first modulation command and the phase of the grid voltage is equal to or smaller than a threshold.

2. The power conversion device according to claim 1, wherein the synchronization adjusting unit circuit includes a voltage adjusting unit circuit configured to generate an amplitude correction signal making a correction amount with respect to the target amplitude larger as the difference between the target amplitude and the amplitude of the grid voltage is larger, and a frequency adjusting unit circuit configured to generate a frequency correction signal making a correction amount with respect to the target frequency larger as the difference between the target frequency and the frequency of the grid voltage is larger, and the first modulation command is corrected on the basis of the amplitude correction signal and the frequency correction signal.

3. The power conversion device according to claim 2, wherein the frequency adjusting unit circuit is configured to generate the frequency correction signal such that the correction amount with respect to the target frequency becomes a value other than zero.

4. A non-transitory computer-readable recording medium on which programmed instructions are recorded, the instructions causing a computer to execute processing, the computer including a computer program for an information processing apparatus controlling a conversion unit circuit serving to convert DC power output from a power supply into AC power and output the AC power, the computer program causing the information processing apparatus to execute: the processing to be executed by the computer comprising:

processing of generating a first modulation command to change an amplitude and a phase of an output voltage from the conversion unit circuit by grid forming control for maintaining the amplitude and the phase of the output voltage at given set values;

processing of generating a second modulation command to change the amplitude and the phase of the output voltage by grid following control for causing the amplitude and the phase of the output voltage to follow an amplitude and a phase of a grid voltage as a voltage of a given power grid;

processing of changing the amplitude and the phase of the output voltage on the basis of the first modulation command or the second modulation command;

processing of switching input to a modulation unit circuit serving to change the amplitude and the phase of the output voltage, the switching being performed such that either the first modulation command or the second modulation command is input to the modulation unit circuit; and processing of correcting the first modulation command before the input to the modulation unit circuit is switched from the second modulation command to the first modulation command, the first modulation command being corrected such that a difference between a target amplitude of the first modulation command and the amplitude of the grid voltage is equal to or smaller than a threshold, a difference between a target frequency of the first modulation command and a frequency of the grid voltage is equal to or smaller than a threshold, and a difference between a target phase of the first modulation command and the phase of the grid voltage is equal to or smaller than a threshold.

5. The recording medium according to claim 4, wherein the processing to be executed by the computer further comprises:

processing of generating an amplitude correction signal making a correction amount with respect to the target amplitude larger as the difference between the target amplitude and the amplitude of the grid voltage is larger; and processing of generating a frequency correction signal making a correction amount with respect to the target frequency larger as the difference between the target frequency and the frequency of the grid voltage is larger, wherein the processing of correcting the first modulation command is performed on the basis of the amplitude correction signal and the frequency correction signal.

6. The recording medium according to claim 5, wherein the processing of generating the frequency correction signal is performed such that the correction amount with respect to the target frequency becomes a value other than zero.

7. A control method implemented by a device including a conversion circuit, a grid forming control circuit, a grid following control circuit, a modulation circuit, and a switching circuit, the conversion circuit serving to convert DC power output from a power supply into AC power and output the AC power, the grid forming control circuit serving to generate a first modulation command to change an amplitude and a phase of an output voltage from the conversion circuit by grid forming control for maintaining the amplitude and the phase of the output voltage at given set values, the grid following control circuit serving to generate a second modulation command to change the amplitude and the phase of the output voltage by grid following control for causing the amplitude and the phase of the output voltage to follow an amplitude and a phase of a grid voltage as a voltage of a given power grid, the modulation circuit serving to change the amplitude and the phase of the output voltage on the basis of the first modulation command or the second modulation command, the switching circuit serving to switch input to the modulation circuit such that either the first modulation command or the second modulation command is input to the modulation circuit, the control method comprising:

correcting the first modulation command before the input to the modulation circuit is switched from the second modulation command to the first modulation command, the first modulation command being corrected such that a difference between a target amplitude of the first modulation command and the amplitude of the grid voltage is equal to or smaller than a threshold, a difference between a target frequency of the first modulation command and a frequency of the grid voltage is equal to or smaller than a threshold, and a difference between a target phase of the first modulation command and the phase of the grid voltage is equal to or smaller than a threshold.

8. The control method according to claim 7, further comprising:

generating an amplitude correction signal making a correction amount with respect to the target amplitude larger as the difference between the target amplitude and the amplitude of the grid voltage is larger; and generating a frequency correction signal making a correction amount with respect to the target frequency larger as the difference between the target frequency and the frequency of the grid voltage is larger, wherein the correcting of the first modulation command is performed on the basis of the amplitude correction signal and the frequency correction signal.

9. The control method according to claim 8, wherein the generating of the frequency correction signal is performed such that the correction amount with respect to the target frequency becomes a value other than zero.

* * * * *